United States Patent Office 3,328,732
Patented June 27, 1967

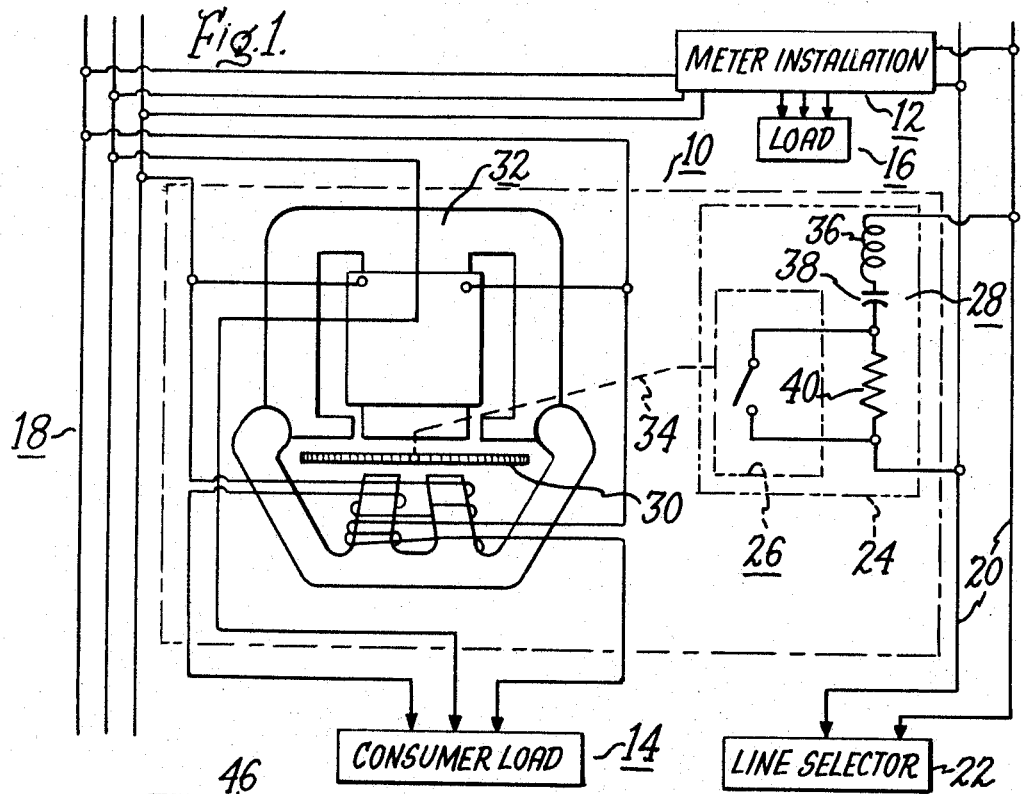

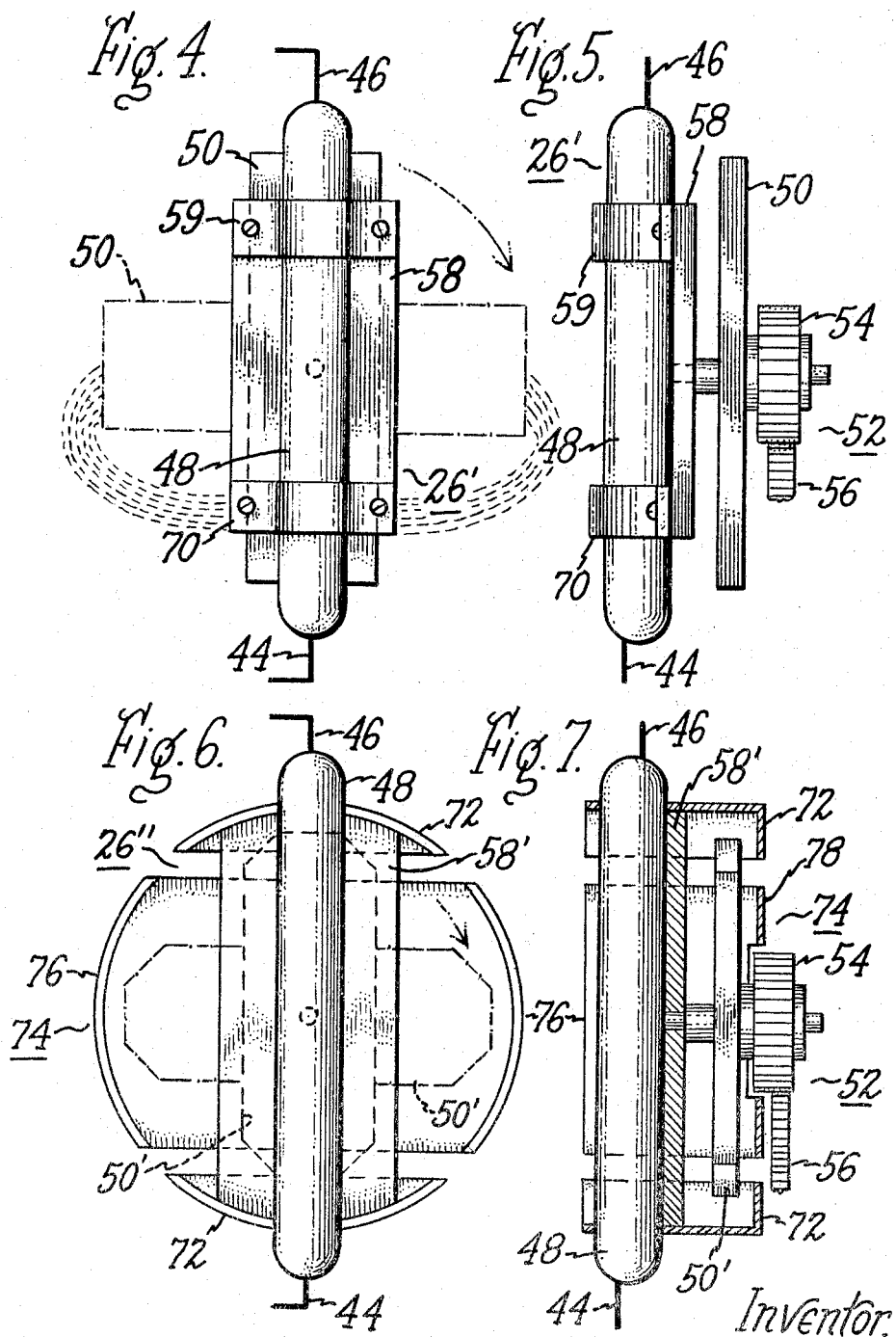

1

3,328,732
SWITCHING DEVICE FOR METERS OF AN AUTOMATIC METER READING SYSTEM
Ansell W. Palmer, Hampton, N.H., assignor to General Electric Company, a corporation of New York
Filed Feb. 28, 1966, Ser. No. 530,557
3 Claims. (Cl. 335—205)

This invention relates to automatic meter reading systems and more particularly to a switching device for use in meters coupled in an automatic meter reading system.

At the present time, most meters registering the consumption of a commodity by a customer, such as, for example electricity, water or gas, are manually read on a periodical basis by meter readers visiting the customer's premises. As is well known this is a slow, laborious task, replete with the opportunity for human error. For example, the meter reader may misread the meter, he may improperly record the reading in his book, or the reading may be improperly transcribed from the meter reader's book. It has long been considered desirable to provide a system for the automatic reading of such meters and for entering such information directly into data handling and computing equipment. Such automatic meter reading systems are disclosed and claimed in Patent No. 3,114,900 and Patent No. 3,164,771.

As disclosed in the above-noted patents, it is necessary that the meters to be automatically read be provided with some means in each meter to generate a signal which is indicaitve either of the actual reading of the meter or a signal which will indicate that a predetermined quantity of the metered commodity has been used by the customer. In the latter instance, it is desirable that each meter being read be interrogated periodically at an interval such that at the maximum rated capacity of the meter only one predetermined quantity could be used between successive interrogations. Patent 3,164,771 discloses and claims this particular type of system.

The invention of this application discloses a switching device which may be provided in meters to be automatically read for providing a desired indication of the consumption by a customer of a predetermined quantity of a metered commodity. It is necessary that a switch of this type be capable of being switched between either of two states and provide in each state a positive signal for indicating the change of state. Of course, the switching device must be coupled to the meter so as to provide such change of state on each use by the customer of a predetermined quantity of the metered commodity. Obviously, the switch must have a positive, non-reversing action and must change state for each predetermined quantity. Also, it will be apparent to those skilled in the metering art that the switching device must not affect the accuracy of the meter. This requires that the switch device have very low torque.

Therefore, it is one object of the invention to provide a novel switching device for use in meters to be automatically read.

It is a further object of this invention to provide a novel switching device which may be coupled to a meter and which will provide a positive non-reversing action to indicate a change of state for each registration by the meter of a predetermined quantity.

It is a further object of this invention to provide a novel switching device which may be coupled to a meter to be automatically read which will change between two states whenever the meter registers the use by a customer of a predetermined amount of a metered commodity.

A still further object of this invention is to provide a novel switching device of very low torque to prevent an adverse effect on meter accuracy.

In Patent 3,164,771 the disclosed automatic meter reading systems in one embodiment contemplates the use of either a series or parallel tuned resonant circuit connected in each meter. In the tuned circuit one element may be inserted or removed to provide the desired signal indicating the use of a predetermined quantity of a metered commodity. Upon interrogation from a central source the tuned resonant circuit exhibits one of two characteristics to indicate the use of the predetermined quantity. This invention proposes a novel switching device connected to a meter and in parallel with the resistance of a tuned series resonant circuit to change the Q of such resonant circuit each time the meter registers the use by the customer of a predetermined quantity of the metered commodity.

The invention which is sought to be protected will be particularly pointed out and distinctly claimed in the claims appended hereto. However, it is believed that this invention together with its various objects and advantages, as well as other objects and advantages thereof, will be more clearly understood by reference to the following detailed description of a preferred embodiment thereof particularly when considered with the accompanying drawings, in which:

FIGURE 1 is a view partially in schematic and partially in block form of a portion of an automatic meter reading system showing this invention in use therewith;

FIGURE 2 is a side view of a preferred form of switching device according to this invention;

FIGURE 3 is a plan view of one element of the novel switching device showing its operation;

FIGURES 4 and 5 are plan and side views of the switching device of this invention showing one form of compensation; and FIGURES 6 and 7 are plan and side views of the switching device of this invention showing an alternate means of compensation.

While this invention will be described with reference to its use in automatic meter reading systems for an electrical distribution system having a plurality of electrical meter installations, it is to be understood that this is for illustrative purposes only. Obviously, it will be apparent to those skilled in the art that the device described and claimed could be used in other metering systems and for metering other commodities such as, for example, water and gas.

Reference will now be made to the drawings in which like numerals are used to indicate like parts throughout the various views thereof. Referring first to FIG. 1 there is shown partially in block and schematic form a portion of an electrical distribution system having electrical meter installations 10 and 12 metering electrical service to the respective consumer loads 14 and 16.

As is more fully explained in Patent No. 3,164,771 this is a portion of one electrical distribution section which may include 100 consumer electric meter installations. A three wire source 18 provides the customary 240 volt, 200 ampere single phase power to the respective consumer loads 14 and 16 through meter installations 10 and 12. Each meter installation reports to a uentral location (not shown) through the wired line 20 and line selector 22 as is more clearly described in Patent No. 3,164,771.

Each meter installation, such as installation 10, includes a signalling stage 24 which comprises the switching device 26 and a series tuned resonant circuit 28. Switching device 26 is coupled to the rotating conducting disk 30 of induction meter 32 through a suitable mechanical coupling 34. As will be apparent, operation of meter 32 will cause switch device 26 to open or close through the coupling 34 each time a predetermined quantity of electricity flows through meter 32 to load 14. As clearly described in Patent No. 3,164,771 the value of the predetermined quantity of electricity is chosen in relation to the interval between meter interrogations, the maximum rated capacity of the electrical service to the load and the minimum acceptable resolution of data to the system user. One such acceptable predetermined quantity would be one kilowatt hour with an interrogation interval of 75 seconds.

Each signalling stage 24 must positively indicate the open or closed state of switch device 26. In the preferred form shown, this is achieved by the series tuned resonant circuit 28, which includes inductance 36, capacitance 38 and resistance 40, the tuned circuit 28 connected in parallel with other tuned circuits across the wired interrogation and signalling line 20, as shown. Switching device 26 is connected in parallel with resistance 40 and alternately shorts out and puts in the resistor 40 in series circuit with inductance 36 and capacitance 38. As will be understood this will change the Q of the resonant circuit 28 providing a positive indication of the change in state of switch device 26. This change of state will of course indicate the use by the consumer load 14 of a predetermined increment or quantity of the measured commodity, in this embodiment, for example, one kilowatt hour of electrical power.

The switching device is best shown in FIG. 2 of the drawings. As there shown, switching device 26 comprises a reed switch 42 containing a pair of magnetic overlapping contact reeds 44 and 46 which are attached to opposite ends of a glass tube 48 which is hermetically sealed and filled with an inert gas. Reed contacts 44 and 46 are normally open but may be closed by the application of an external magnetic field. A rotating permanent magnet 50 is provided, magnetized so that the lines of flux run lengthwise. The magnet 50 is mounted for rotation with its axis at the center of the reed contacts 44 and 46 as indiacted at 49. A gear train 52 is provided which includes gear 54 connected to rotate magnet 50, and a driving gear 56 connected to the gear train (not shown) of an induction meter such as, for example, 32. As is well known, the gear train of an induction meter is driven from a worm on the shaft of the conductive rotating disk and drives the meter register. As will be understood, rotatable magnet 50 is essentially a low torque device which will not appreciably affect the accuracy of the induction meter.

To rotatably mount magnet 50 a non-magnetic support plate 58 may be provided. Support plate 58 may be secured to the meter device in any desired manner. A bore (not shown) is provided in support plate 58, to receive the rotatable shaft of rotating magnet 50. Support plate 58 is also provided with a pair of non-magnetic brackets 59. As shown in FIG. 2, reed switch 42 is secured to support plate 58 by means of brackets 59. Any other manner of rotatably mounting the magnet 50 with respect to reed switch 42, may be used.

FIGURE 3 shows the operation of magnet 50 as it rotates about reed switch 42, reed switch 42 being shown in phantom lines. As can be seen from FIG. 3, as magnet 50 rotates about reed switch 42, four changes of state will occur for each revolution of magnet 50. For example, when magnet 50 is directly over the reed switch (as shown in phantom lines) the reed contacts 44 and 46 will be closed. As the magnet rotates, for example clockwise as in FIG. 3, as soon as magnet 50 reaches a position where the magnetic field is weaker than the resiliency of reeds 44 and 46 the reeds will open with a snap action. This is indicated at line 60 in FIG. 3. As magnet 50 continues to rotate clockwise it reaches a point where the magnetic field is again sufficient to overcome the resiliency of the reeds 44 and 46. At this point, which is indicated by line 62, reeds 44 and 46 will close with a snap action. Further rotation will bring magnet 50 to line 64 where again the resistance of reed contacts 44 and 46 is stronger than the magnetic field and the contacts open. Finally, magnet 50 rotates to position 66 where the magnetic field is again sufficient to close reed contacts 44 and 46. Thus, as can be seen from FIG. 3, rotation of magnet 50 about the contact point 49 of reeds 44 and 46 will bring four changes of state during each revolution.

From the above it will be apparent that to provide a change of state for each kilowatt hour, the magnet 50 will be geared to the gear train, driving the register. Since the first pointer shaft of a watt-hour register indicates the accumulation of 10 kilowatt hours per revolution, the velocity of rotation of the gearing between the first pointer shaft and the magnet 50 would be 1/2.5 to provide for a kilowatt hour indication for each change of state of reed switch 42. As will be understood, the switch assembly will be provided with a magnetic shield (not shown) to prevent interaction between the meter damping magnets of the watthour meter and the magnetic field of magnet 50.

The length of "on" and "off" time of the reed contacts 44 and 46 can be adjusted by moving either switch 42 or magnet 50 so that the contact point 49 is not at the rotating center of magnet 50. The "on" time for contacts 44 and 46 will shorten as the contact point and the center of magnet 50 are moved further away from each other.

As will be understood, the magnetic coupling between reed switch 42 and magnet 50 will require additional torque to move magnet 50 away from the vertical position with respect to reed switch 42. This torque variation will be relatively low. However, as will be understood it is desirable to provide as small a variation as possible. Compensation may be provided to substantially reduce the torque variation without shunting away the working flux of the magnet. One such compensation is shown in FIGS. 4 and 5 of the drawings. FIGURE 4 is a bottom view and FIGURE 5 is a side view of a switching device 26' similar to that shown in FIG. 2, with compensation added to reduce the torque required to move rotatable magnet 50 from vertical position with respect to reed switch 42. In the modification shown in FIGS. 4 and 5, a magnetic member 70 is provided close to one end of glass tube 48, as shown. This magnetic member 70 may be used in place of bracket 59, shown in FIG. 2, if desired. In such case, there would be a non-magnetic support plate 58, an upper non-magnetic bracket 59, and a lower magnetic bracket 70. As will be understood, the magnetic bracket 70 will provide a path for the magnetic flux when magnet 50 is in the horizontal position, shown in phantom lines. This will tend to equalize the reluctance path for the flux in all positions of the magnet 50. Therefore, the compensator 70 will lessen the torque required to move magnet 50 from the vertical position, directly in line with reed members 44 and 46.

A second type of compensation may be provided in the form of a shrouding system shown in FIGS. 6 and 7. In these figures, FIG. 6 is a bottom view while FIG. 7 is a side view of a further modification of the switching device. As shown, the switching device 26" is provided with magnetic compensation in the form of vertical shroud 72 and horizontal shroud 74. Vertical shroud 72 includes the curved magnetic members 72 on opposite ends of tube 48, preferably secured to support plate 58', of non-magnetic material, as shown. As will be understood, shroud members 72 provide a path from magnetic member 50' through reed switch 42, giving a separate magnetic circuit for the "on" condition of reed switch 42. Shroud 74 includes a pair of curved end members 76 connected by upper plate member 78, all formed of magnetic material. As can be seen from FIG. 6 as magnet 50' moves from the vertical to the horizontal position, the path for the magnetic flux will change from the magnetic circuit through shroud 72 and reed switch 42 to the magnetic circuit through shroud 74. It will be clear that the magnetic circuit through shroud 74 will be crosswise of reed switch 42 or for the "off" condition of the switch. Of course, it will be obvious to those skilled in the art that other types of compensation may be used, if desired.

While there has been shown and described the preferred embodiment of this invention it will be understood by those skilled in the art that various changes may be made in the relative size, position and construction of the various elements without departing from the spirit and scope of the invention as defined in the appended claims.

What is claimed as new and which it is desired to secure by Letters Patent of the United States is:

1. A switching device for use in meters of an automatic meter reading system comprising, in combination, an elongated reed switch, a pair of normally open magnetic, overlapping, contact members mounted in opposite ends of said switch, an electrical lead connected to each of said contact members, a rotatable elongated magnet magnetized along its length, means rotatably mounting said magnet with its axis of rotation substantially at the point of overlap of said contact members, means to rotate said magnet about said reed switch whereby when said magnet is substantially parallel to said reed switch said overlapping contact members are closed and when said magnet is substantially crosswise to said reed switch said overlapping contact members are open, and a magnetic compensating means on said reed switch to provide an additional path for the magnetic flux of said magnet to thereby decrease the torque required to move said magnet from the parallel position with respect to said reed switch.

2. A switching device as claimed in claim 1 in which said magnetic compensator is in the form of a magnetic member mounted near one end of said reed switch and extending substantially crosswise in direction with respect to said reed switch.

3. A switching device as claimed in claim 1 in which said magnetic compensation is in the form of magnetic shroud means, a pair of shrouds of magnetic material mounted crosswise to said reed switch and a second pair of shrouds of magnetic material mounted lengthwise of said reed switch.

References Cited

UNITED STATES PATENTS

| | | | |
|---|---|---|---|
| 2,207,506 | 7/1940 | Cox | 200—87 |
| 3,087,030 | 4/1963 | Shebanow | 200—87 |
| 3,170,052 | 2/1965 | Hajos | 200—87 |

BERNARD A. GILHEANY, *Primary Examiner.*

J. J. BAKER, R. N. ENVALL, JR., *Assistant Examiners.*